Aug. 28, 1951  R. M. SIGMON, JR  2,566,039
ELECTRICAL CABLE CONNECTION BOX
Filed Aug. 30, 1948  3 Sheets-Sheet 1
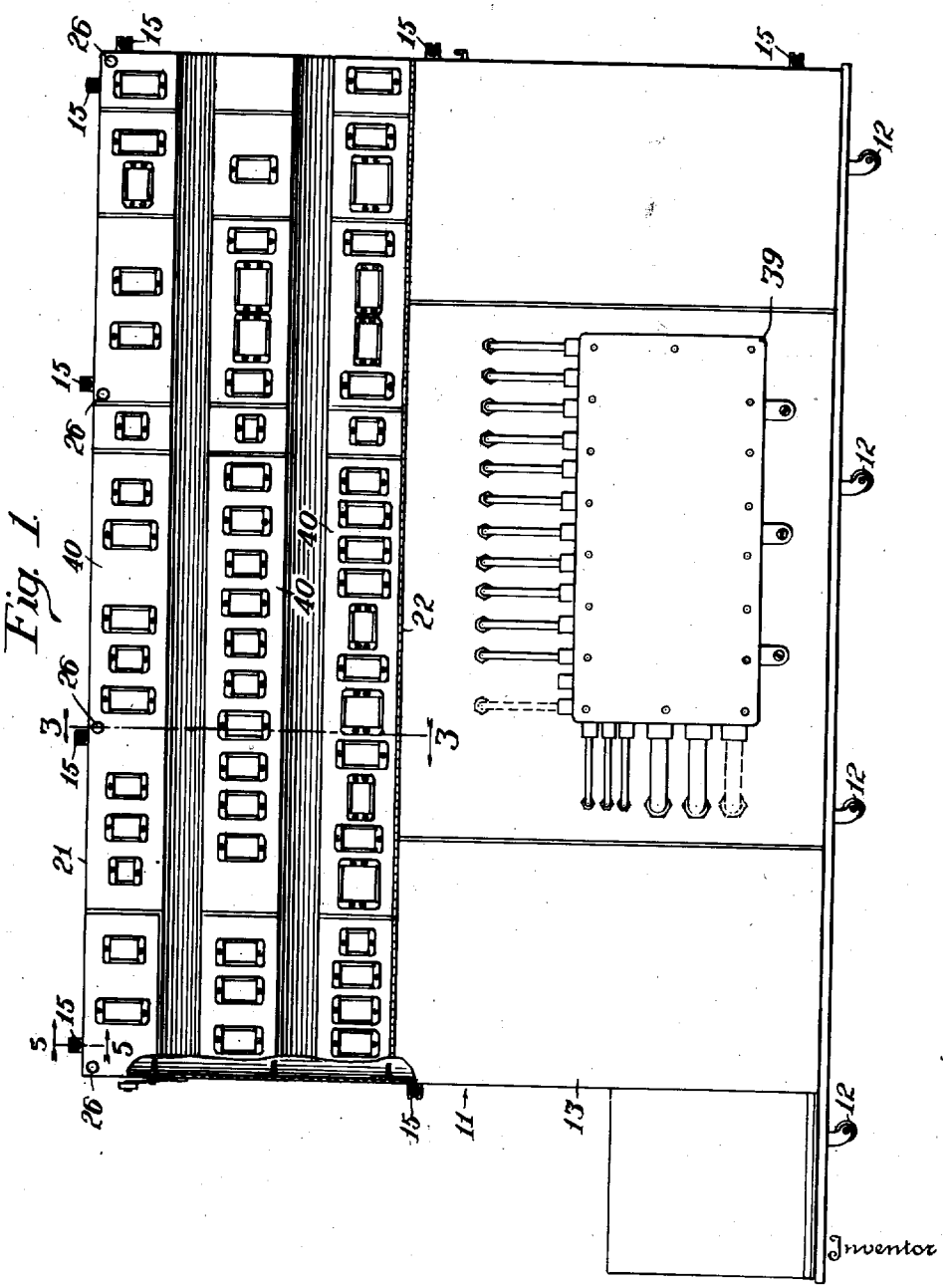
Inventor
Ross M. Sigmon Jr.
By
C. P. Hamilton,
ATTORNEY Aug. 28, 1951   R. M. SIGMON, JR   2,566,039
ELECTRICAL CABLE CONNECTION BOX
Filed Aug. 30, 1948   3 Sheets-Sheet 2
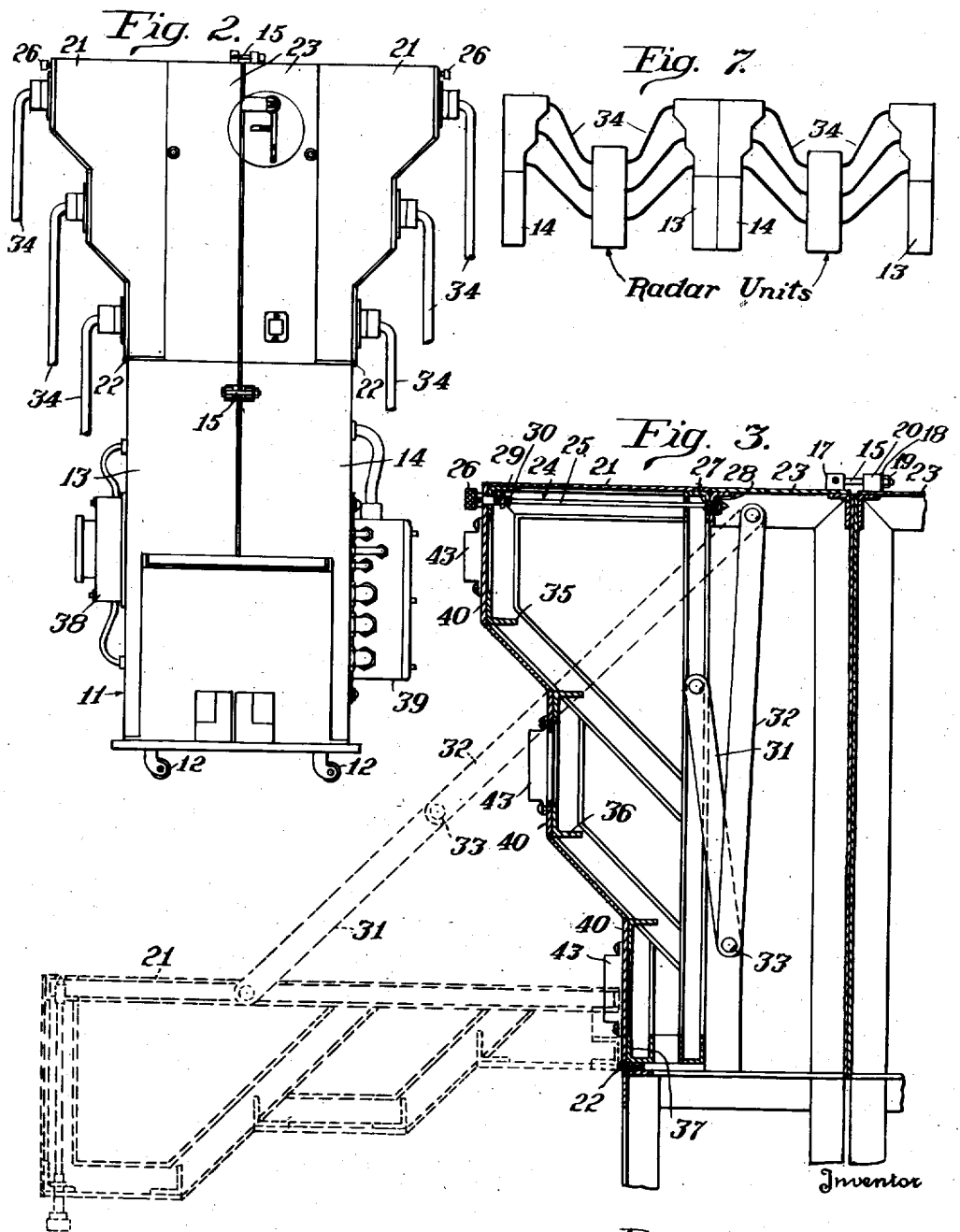
Inventor
Ross M. Sigmon Jr.
By
C. B. Hamilton
ATTORNEY Aug. 28, 1951   R. M. SIGMON, JR   2,566,039
ELECTRICAL CABLE CONNECTION BOX
Filed Aug. 30, 1948                                  3 Sheets-Sheet 3
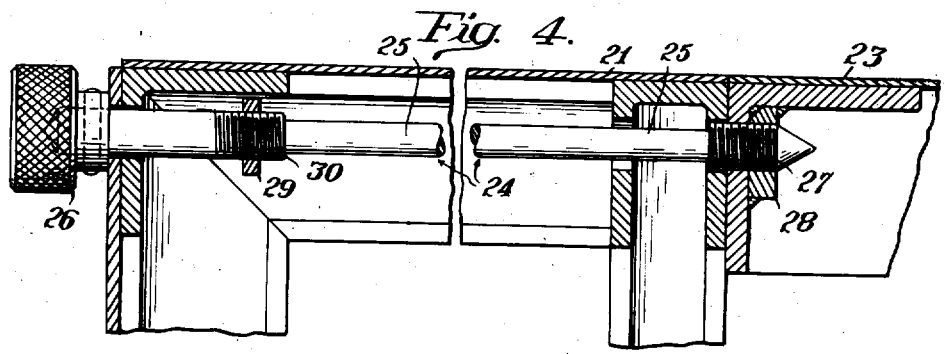
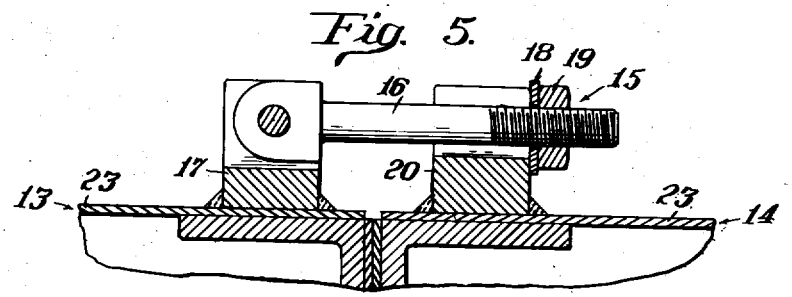
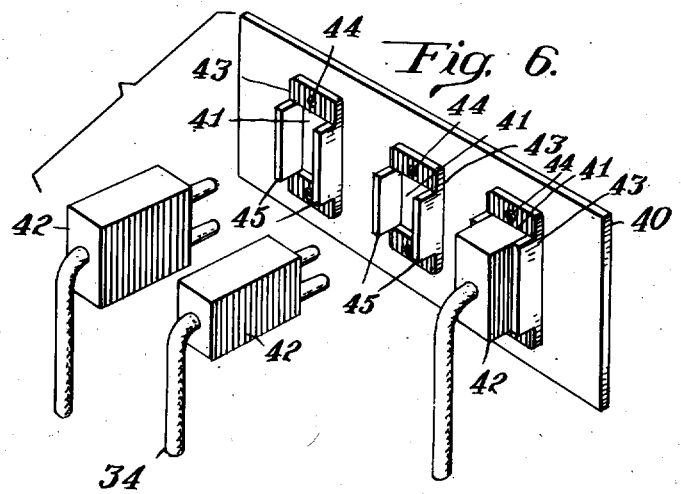
Inventor
Ross M. Sigmon Jr.
By
C. B. Hamilton
ATTORNEY Patented Aug. 28, 1951

2,566,039

UNITED STATES PATENT OFFICE 2,566,039

ELECTRICAL CABLE CONNECTION BOX

Ross M. Sigmon, Jr., Winston-Salem, N. C., assignor to Western Electric Company, Incorporated, New York, N. Y., a corporation of New York Application August 30, 1948, Serial No. 46,754

8 Claims. (Cl. 175—298)

This invention relates to electrical connecting apparatus and more particularly to a cable connection box for conveniently interconnecting different units of a radar system while under test.

High voltage is used in the testing of the various units of a radar system and, accordingly, special precautions must be taken to safeguard the operators conducting these tests. Heretofore, long lengths of high voltage cable have been strung along shop floors from the units under test to the testing apparatus thereby creating hazardous conditions for the operators making the tests.

An object of the present invention is to provide an efficient, light and compact mobile apparatus for electrically interconnecting with short leads the separate units of a radar system.

In accordance with one embodiment of the invention, a portable aluminum connection box is provided which is larger at the top than at the bottom and is provided with a series of stepped back or recessed terminal panels in the upper half of the box, both front and rear, to provide clearance for numerous cable leads suspended from the various panels. These panels are stencilled in different identifying colors which correspond with the color of the cable leads connected thereto. The box is divided longitudinally into two hinged half sections which are held together by suitable locking means whereby quick access is had to the interior of the box when it is moved to a desired location to provide off the floor, short electrical connections to apparatuses.

A complete understanding of the invention may be obtained from the following detailed description taken in conjunction with the accompanying drawings in which:

Fig. 1 shows a front elevation of the connection box embodying the invention;

Fig. 2 is an end view or side elevation of the connection box as shown in Fig. 1;

Fig. 3 is an enlarged fragmentary vertical section taken along line 3—3 of Fig. 1 showing in particular the hinge construction of the stepped back frame sections;

Fig. 4 is an enlarged fragmentary view of the uppermost part of the frame in Fig. 3 showing in particular the locking means for the stepped back sections;

Fig. 5 is an enlarged fragmentary sectional view of the frame locking means taken along line 5—5 in Fig. 1;

Fig. 6 is a perspective view of one of the detached terminal panels and plugs of the connection box; and Fig. 7 is a diagrammatic arrangement of the connection box with its associated radar units.

Referring now to the drawings, wherein like reference numerals designate the same parts throughout the several views, a cable connection box 11, embodying the invention, is shown movably mounted on a plurality of rollers 12 (Figs. 1 and 2). This connection box 11 is made of aluminum and is larger at the top than at the bottom (Fig. 2) and is longitudinally divided into two half sections 13 and 14. The two sections 13 and 14 are held together by a plurality of locking means 15 which are located at predetermined distances along the top and sides of the box 11 (Figs. 1 and 2). The locking means 15 consists of a pivotally mounted bolt 16 held in a U-shaped dog 17 (Fig. 5) welded to the section 13. The other end of the bolt 16 is threaded and carries a washer 18 and a nut 19 which may be adjusted to bear against a similar U-shaped member 20 welded to the section 14. In this manner, the plurality of locking means 15 firmly holds the sections 13 and 14 together.

Both front and rear sections 13, 14 of the upper half of the box 11 have pivotally mounted therein by means of hinges 22 two individual frame sections 21, each of which is adapted to be swung from a vertical to a horizontal position as shown in dotted lines in Fig. 3. The sections 21 in their vertical position abut against companion sections 23 which form the inner portions of sections 13 and 14 as shown in Figs. 2 and 3. The hinged section 21 is locked to its companion section 23 by a locking means 24 which consists of a locking rod 25 which extends through section 21 into section 23. The rod 25 has a knurled knob 26 fixed to its outer end projecting from the section 21. A threaded portion 27 at the other end of the rod 25 engages a nut 28 welded to an inner portion of the frame 23. By turning the knurled knob 26 in a clockwise direction the portion 27 of the rod 25 will be threaded into the nut 28 thereby locking the two sections 21 and 23 together (Fig. 4). When the section 21 is in its horizontal open position the rod 25 is prevented from slipping out of section 21 by a nut 29 which is located on a threaded portion 30 of the rod. Thus, each section 21 may be easily unlocked to allow the operator access to the interior of the box 11.

The sections 21, in moving from a vertical to a horizontal position, are constrained to move in an arcuate path by the hinges 22 and a plurality of pairs of connected links 31 and 32. The links 31 and 32 are located at different points along the inside of the box 11 and are loosely secured at their outer ends to the sections 21 and 23. The inner ends of the links 31 and 32 are connected to each other by a pin 33 which allows the links to oscillate together about this pin and limit the downward movement of the sections 21. The link 31 is smaller in length than the link 32 and, therefore, when the section 21 is moved from the vertical to the horizontal position, the links will unfold from the vertical closed position shown in Fig. 3 in solid lines, to the horizontal open position shown in dotted outline.

In the description of the connection box 11 heretofore given, it has been described as one integral operative unit consisting of two sections 13 and 14. However, it is to be understood that the sections 13 and 14 are each separate and distinct units mechanically coupled together and are not electrically interconnected. Thus it is possible to uncouple the locking means 15 and use each section 13 and 14 as a separate connection box. In Figure 7, an arrangement for testing a radar system is diagrammatically shown which illustrates the employment of both the separate sections 13 and 14 and the combined or coupled connection box 11. Since the connection box 11 comprises the entire invention per se, it is not necessary to the understanding of the invention to give a detailed description of the several units of the radar system.

The sections 21 each have a stepped back construction consisting of three horizontal stepped portions 35, 36 and 37 located at different levels which successively approach the longitudinal axis of the box 11 (Fig. 2). This construction of the sections 21 allows three groups of cables 34 when connected thereto to be suspended so as to lie in three vertical separate planes. In this manner, entanglement of the cables 34 is prevented, and a neat and orderly arrangement is had whereby the operator is able to easily trace the cables to their respective positions on the box 11. The connection box 11 has mounted on its lower sections 13 and 14, respectively, junction boxes 38 and 39 for interconnecting the cables 34.

The stepped back portions 35, 36 and 37 have welded thereon a plurality of terminal panels 40 (Fig. 1) which are of the same width but of different lengths. As shown in Fig. 1, a plurality of panels 40 varying in number are secured to each of the stepped back portions. The panels 40 each have formed therein one or more rectangular openings 41 to accommodate a plug 42 secured to the end of each of the cables 34. Positioned about each of the openings 41 is a metal frame 43 secured by round head screws 44 to the panels 40. The frames 43 are provided with resilient flanges 45 along two edges which guide the plugs 42 into the openings 41 and hold them in place (Fig. 6). The plugs 42 and the frames 43 are stencilled with corresponding colored paint to indicate to the operator in which opening each plug is to be placed. In this manner, there is neither delay nor error in connecting the cables 34 to the box 11.

It is to be understood that the above-described arrangement is simply illustrative of the application of the principles of the invention. Numerous other arrangements may be readily devised by those skilled in the art which will embody the principles of the invention and fall within the spirit and scope thereof as defined by the appended claims.

What is claimed is:

1. In an electrical connecting apparatus, a box having an exterior wall with a series of stepped back sections, each stepped back section overhanging the next succeeding section beneath it and means secured to the stepped back sections for mounting the ends of conductors, a plurality of groups of external flexible electrical conductors having their ends terminating in connectors connected to said means, said stepped back sections permitting each group of conductors to be suspended in different vertical planes so as to prevent entanglement of the conductors.

2. In an electrical connection box, a pair of frames mounted back to back having stepped external front sections, terminal panels mounted on the stepped front sections, and terminal means secured to said panels for holding and mounting the ends of a plurality of groups of electrical conductors thereon, each of said stepped sections overhanging the next succeeding stepped back section to permit each group of electrical conductors to lie in different vertical planes so as to prevent entanglement of said conductors.

3. An electrical connection box comprising a frame composed of two half sections, means for locking the half sections together, each half section including a stepped back frame section pivotally mounted on the half section, means for locking the stepped back frame section to the half section, and means on the stepped back frame section for connecting a plurality of electrical conductors thereto, said stepped back frame sections being adapted to be swung outwardly about the pivots in the half sections to provide access to the interior of the box.

4. In an electrical connecting apparatus, a frame, a series of stepped back sections forming a part of the frame, a series of terminal panels secured to the stepped back sections at different levels for connecting the ends of conductors thereto, a plurality of groups of flexible electrical conductors having their ends terminated in connectors connected to said panels, and a plurality of frames mounted on the terminal panels and about openings therein to engage and hold the connectors, the arrangement of said stepped back sections overhanging the next lower section to permit the conductors to lie in separate planes.

5. A portable electrical connection test box consisting of two identical box sections each of which comprises a back frame, a movable front stepped vertical frame pivotally mounted to the back frame, said stepped front frame being formed with each step overhanging the next succeeding lower step, terminal panels secured on each of the stepped portions of the front frame and having connector openings for receiving the plugs of a plurality of conductors so that the conductors from each of the stepped portions lie in different planes, restraining means located within the frames for limiting the outward pivoted movement of the front stepped frame, means loosely held in the front stepped frame for locking it to the back frame when a testing operation is being performed, and securing means on said back frame for mechanically joining thereto the identical back frame on the other box section.

6. A connection box for interconnecting units to be tested with testing apparatus comprising a pair of identical portable frames, means secured to said frames for mechanically interlocking the frames together, an upper front section of each of said frames being stepped downward and backward so that the frames are larger at the top, terminal panels fixed on said stepped portions and adapted to secure and electrically interconnect various colored ends of a group of conductors whereby each group of conductors of each stepped portion lie suspended in different vertical planes, members secured to the panels and having different colors to correspond to the various colors on the conductor ends, said ends being resiliently held to the panels by said colored members, means located at one edge of the stepped section of each frame to allow it to be swung outwardly from the lower part of the portable frame to provide access to the interior of the connection box, and means for locking the stepped part of the frame to the portable frame in closed position while a testing operation is being performed.

7. An electrical connection box consisting of two identical box sections each of which comprises a metal frame, an upper front section of said frame having a series of stepped-back portions, terminal panels secured to each of said stepped portions and having different sized openings therein to accommodate the ends of a plurality of groups of conductors so that each group of conductors lie suspended in different vertical planes from the stepped-back portions, resilient members mounted on the panels and about the openings therein to secure the ends of the conductors thereto, pivoted means secured to one edge of the stepped upper front section to allow it to be swung outwardly from the frame, a plurality of linkages located within the upper half of the metal frame to limit the outward movement of the upper stepped front section, means located on the upper stepped front section for locking it to the metal frame in closed position, and means positioned atop each metal frame for mechanically interlocking thereto the other identical box section.

8. A connection box for interconnecting units to be tested with testing apparatus comprising a pair of identical portable frames, means secured to said frames for mechanically interlocking the frames together, an upper front section of each of said frames being stepped downward and backward in a series of receding steps so that the frames are larger at the top, terminal panels fixed on said stepped sections and adapted to secure and electrically interconnect various groups of interchangeable conductors whereby each group of conductors of each stepped section lie suspended in different vertical planes, means located at one edge of the stepped section of each frame to allow it to be swung outwardly from the lower part of the portable frame to provide access to the interior of the connection box, and means for locking the stepped sections of the frame to the portable frame in closed position while a testing operation is being performed.

ROSS M. SIGMON, Jr.

REFERENCES CITED

The following references are of record in the file of this patent:

UNITED STATES PATENTS

| Number | Name | Date |
| --- | --- | --- |
| 589,760 | Tailleur | Sept. 7, 1897 |
| 750,804 | Burnstone | Feb. 2, 1904 |
| 1,612,952 | Stevenson | Jan. 4, 1927 |
| 1,784,236 | Jones | Dec. 9, 1930 |
| 1,889,308 | Baxter | Nov. 29, 1932 |
| 2,130,250 | Reed | Sept. 13, 1938 |
| 2,185,562 | Nielsen | Jan. 2, 1940 |

FOREIGN PATENTS

| Number | Country | Date |
| --- | --- | --- |
| 428,842 | Germany | May 1, 1926 |
| 834,000 | France | Nov. 8, 1938 |

Certificate of Correction

Patent No. 2,566,039 — August 28, 1951

ROSS M. SIGMON, Jr.

It is hereby certified that error appears in the printed specification of the above numbered patent requiring correction as follows:

Column 4, line 55, strike out "vertical" and insert the same after "stepped" in line 59, same column;

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*